Figure 1:
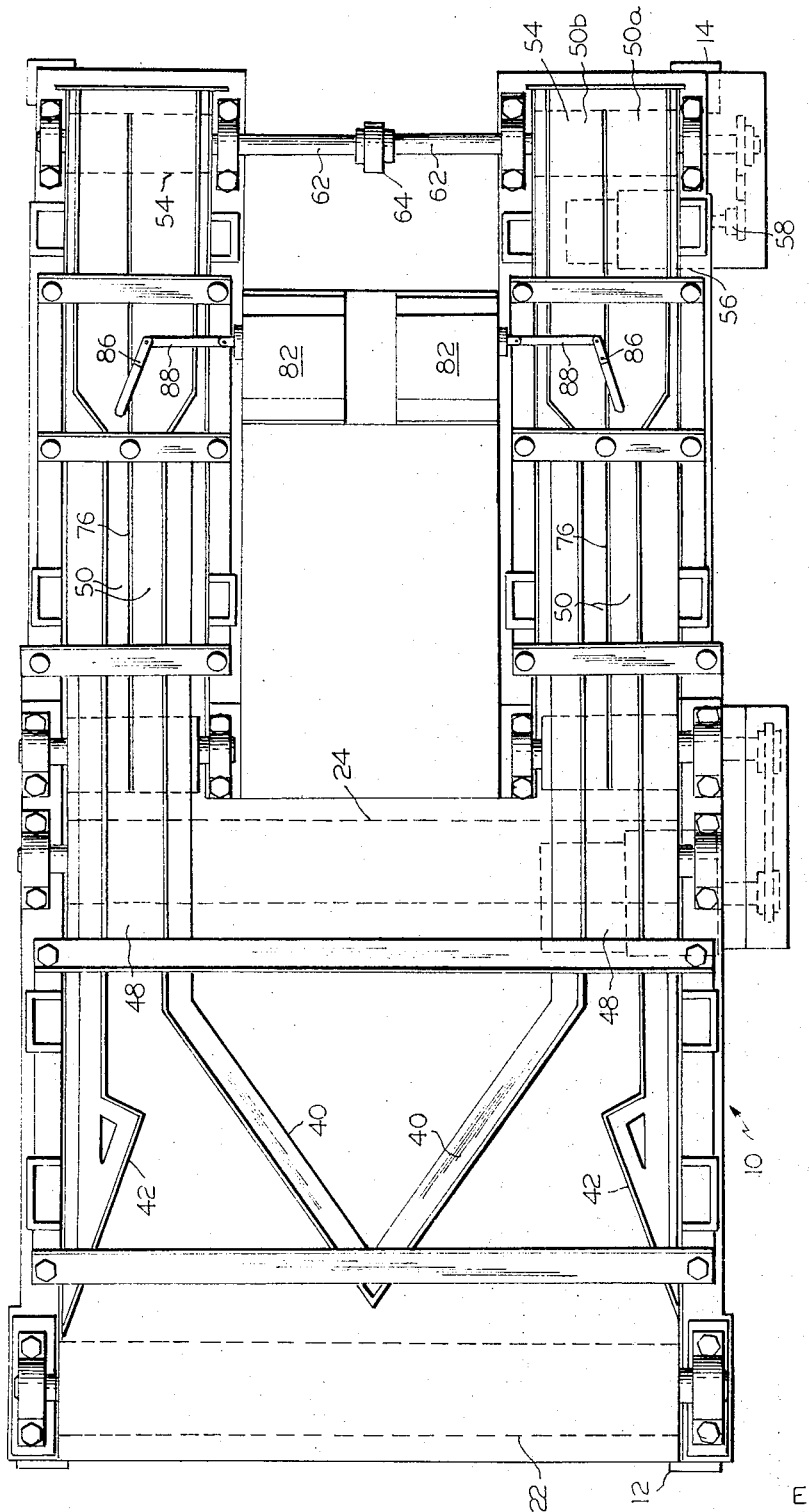

United States Patent [19]
London et al.

[11] 3,810,554
[45] May 14, 1974

[54] FREEZER UNLOADING SYSTEM FOR HAMBURGER PATTIES

[76] Inventors: Eugene J. London, 324 College Dr., Allentown, Pa. 18104; John L. Boncher, Jr., 25 Lewis St., Phillipsburg, N.J. 08865

[22] Filed: Sept. 8, 1972

[21] Appl. No.: 289,187

Related U.S. Application Data

[63] Continuation of Ser. No. 100,641, Dec. 22, 1970, abandoned.

[52] U.S. Cl. ............... 214/6 D, 198/30, 198/31 AC
[51] Int. Cl. ............................................. B65g 57/09
[58] Field of Search ........ 214/6 DK, 6 D, 6 H, 6 P, 214/6 N; 198/30, 31 R, 31 AC, 32

[56] References Cited
UNITED STATES PATENTS

| | | | |
|---|---|---|---|
| 3,095,960 | 7/1963 | Luginbuhl | 198/30 |
| 3,332,530 | 7/1967 | Greulich | 198/32 |
| 3,416,640 | 12/1968 | Svobida | 198/31 AC |
| 3,392,853 | 7/1968 | Mitchell et al. | 214/6 DK |
| 3,593,624 | 7/1971 | Dufour | 214/6 D |
| 2,928,520 | 3/1960 | Boehler | 198/30 X |

Primary Examiner—Robert J. Spar
Attorney, Agent, or Firm—Misegades & Douglas

[57] ABSTRACT

A freezer unloading system that accepts hamburger patties from a freezer discharge end or terminal in substantially semi-uniform rows of up to 12 patties across the terminal at a rate of 25,000 per hour which includes a means of a series of baffles or guides that orient the patties into single file rows. The rows are then discharged onto secondary conveyors which move the single file patties between a photoelectric light source and photo-receiver or other count sensor means which count each patty as it passes. The photoelectric cell works in conjunction with a count controller which is manually set for the desired number of patties to be stacked together on a discharge transition location. Immediately downstream of the photoelectric cell is a diverter gate which splits each secondary conveyor into two discharge lanes, which is accomplished automatically from one position to the other by an electric signal responsive to the count controller when a predetermined count is reached. The switching allows a predetermined number of patties to be collected at each discharge station, thereby allowing an operator to alternatively pick off stacks of patties for the packaging operation.

3 Claims, 2 Drawing Figures

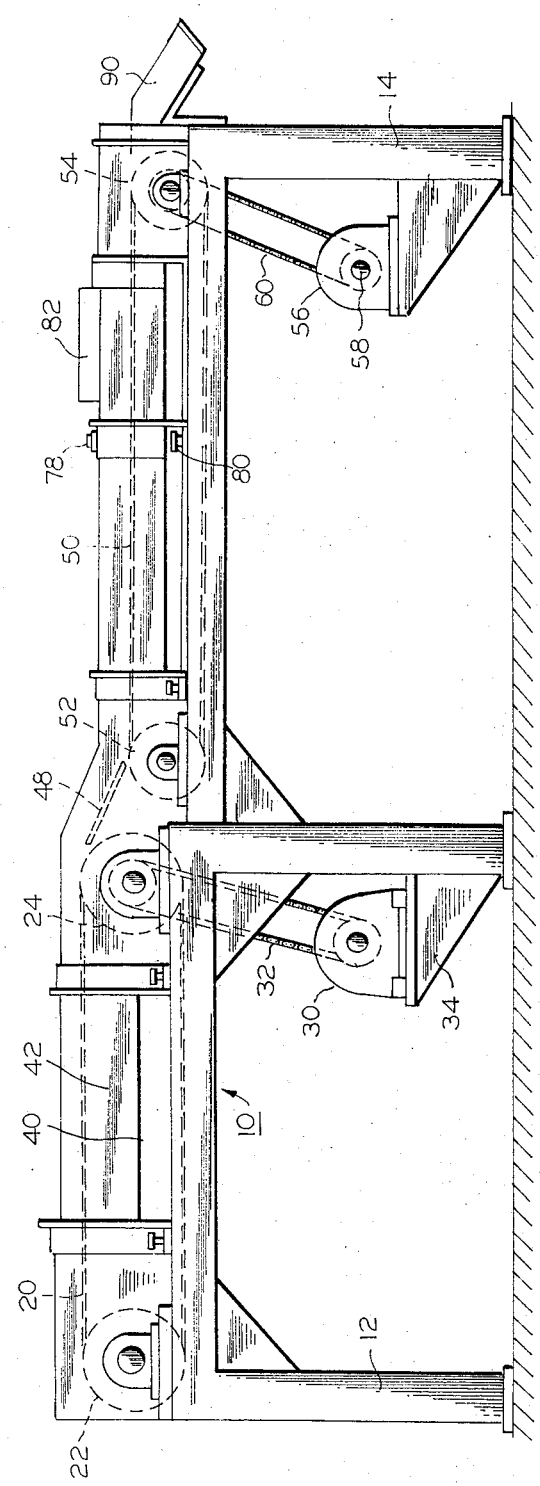

FREEZER UNLOADING SYSTEM FOR HAMBURGER PATTIES

CROSS REFERENCE TO RELATED APPLICATIONS

This application is a continuation application of U.S. application Ser. No. 100,641, filed Dec. 22, 1970, now abandoned.

The present invention relates to an improved means for a freezer unloading system for hamburger patties and, more particularly, the invention relates to uniques features of a freezer unloading system that provides high volume output with low labor requirements by using an electrical circuit combination of conventional components that operate in a new, different and unobvious manner.

Another feature of the invention relates to its modular construction that allows rapid disassembly necessary for cleaning and repair of the apparatus.

It is therefore an object of the invention to provide a freezer unloading system in which hamburger patties are arranged and oriented from a semi-uniform row into single file rows of patties which are then stacked into a predetermined number of patties, that are than picked off for subsequent packaging operations.

A further object and feature of the invention is to provide a series of conveyor belts with a baffle arrangement for diverting a semi-uniform row into single file rows of patties and for counting the patties in each of said single file rows, and a gate means responsive to a count controller means for splitting the single file row of patties into two distinct discharge lanes, each having a predetermined count of patties therein, which are then advanced to a pick-off station for stacking the patties into said predetermined count.

A further object and advantage of the invention is that the arrangement of primary and secondary conveyor means, a gate and count controller means for said gate, provide modular construction and rapid disassembly thereof for adjustment, cleaning and convenient stacking in predetermined amounts of patties at a packaging station.

An additional feature and distinct advantage of the invention is that a freezer stage provides for discharge of a semi-uniform row of hamburgers which pass onto a primary conveyor having a series of baffles for reorienting the hamburgers into secondary single file rows of hamburgers on a secondary conveyor. Upon counting the hamburger patties on the secondary conveyor by a photoelectric light source and receiver or other count sensor means, a gate is operated by the photoelectric light source and receiver means which allows stacking in predetermined counts of hamburger patties at a packaging station of the hamburger patties, as determined by the count controller means.

The above and other objects and advantages of the invention will become apparent upon full consideration of the following detailed description and accompanying drawings in which:

FIG. 1 is a plan view of a freezer unloading system for hamburger patties according to one of the preferred embodiments of the present invention; and FIG. 2 is an elevation view of the freezer unloading system shown in FIG. 1.

Referring now to the drawings, there is shown a table stand 10 having legs 12,14 at each end and which is provided with a primary conveyor belt 20 mounted upon rollers 22,24, respectively. The primary conveyor belt extends substantially the width of the table and covers an intermediate or primary length of the table stand. The roller 24 is driven by a motor 30 coupled to the roller 24 by a chain 32. The motor is mounted from an intermediate support or shelf arrangement 34, as shown.

Along the primary conveyor belt, there are provided a series of guides or baffles including a central baffle 40,40 which is essentially V-shaped, and a peripheral or side baffle 42,42, and these series of baffles are disposed and arranged to orient the patties from a semi-uniform row such as 12 patties, into single file rows of patties as they proceed into the mouth or smaller portion of the primary conveyor belt 20.

As the patties in single file relation reach the terminal portion of the primary conveyor belt, they proceed along an inclined plastic or metal sheet 48, or similar means, which dispenses the patties in series relation onto further secondary conveyor belts 50,50 which extend substantially beyond the width of said single file rows of patties received from said first primary conveyor belt 20, and which extend essentially an intermediate or secondary length of the table stand, as shown.

Each of the secondary conveyor belts 50,50 is mounted from a drum or roller 52,54, roller 54 being driven by a motor 56 which drives a sprocket 58 and chain 60 for turning the rollers 52,54, which may be mounted on a common shaft 62,62 coupled by a flanged coupling 64, as is well known.

The preferred arrangement and construction of the belts 50,50 is that they may be disposed in pairs 50,50 and separated by a small space or gap defined as 76,76 interposed between each of the pairs of belts 50,50. Thus, there may be provided a space along the belts 50,50 so that the hamburger patties straddle or bridge the gap 76,76, respectively, so that each patty reaches a point provided with a photoelectric light source 78 and a photoelectric light receiver 80. Of course, these elements can be interposed in their locations as may be desired, but as a hamburger patty passes along the belts 50,50, and intercepts subsequently a light beam from the source 78 projected toward the receiver 80, the light beam causes a single break at the receiver 80 which is communicated to count controller means 82,82, respectively, as the case may be, so that a predetermined count of hamburger patties is made and when a specified precount is reached, the count controller means 82,82 actuates its respective diverter gate 84, the gate causing therefore the splitting of the single file rows of patties into a second or resulting in two discharge lanes of hamburger patties, and while there may be a predetermined number of patties passing along one of the secondary conveyor belts 50, such as 50A, there will now commence the passage of precount or predetermined number of hamburger patties onto the other secondary conveyor belt 50, such as 50B.

The diverter gates 84 are pivoted at a pivot means 86 and are driven by a crank or pivot arm 88 driven by the count controller means which may include a solenoid or other electromechanical driving means, not shown, and as is well known in the present art of the electromagnetic and electromechanical devices.

The portions of the secondary conveyor belts 50A, 50B become engaged to a discharge transition means 90 which couples with the terminal edge of the secondary conveyor belts 50A, 50B, so that the hamburger patties are discharged therefrom onto a stacking platform by the pick-off stacks effectuated by the discharge transition station 90 and the stacked hamburger patties are of a predetermined count, from which they are removed for a subsequent packing operation (not shown).

Thus, it is seen that the objects and advantages that are set forth in the foregoing specification and description are accomplished in the manner and by the mechanical features that are set forth hereinabove.

Additional embodiments of the invention in this specification will occur to others and, therefore, it is intended that the true spirit of the invention be limited only by the appended claims and not by the embodiments described hereinabove. Accordingly, reference should be made to the following claims in determining the true spirit of the invention.

What is claimed is:

1. A freezer unloading system for hamburger patties and the like, comprising:
    a table stand supported at opposite ends;
    a conveyor belt mounted on large diameter rollers and having the conveyor belt extending substantially the width of the table stand and covering a primary length of the table stand, said conveyor having a receiving station for accepting patties from a feeder discharge station in essentially semi-uniform rows;
    a series of baffles disposed and arranged to orient the patties from said semi-uniform rows into single file rows of patties;
    a further conveyor belt mounted on small diameter rollers and having the conveyor belt extending substantially beyond the width of said single file rows of patties received from said first-mentioned conveyor belt and extending essentially a secondary length of the table stand;
    said further conveyor belt having a higher linear velocity than that of said first-mentioned conveyor belt as a result of the diameter relation of said rollers;
    a photoelectric light source and receiver arrangement spanning each of said single file rows on said further conveyor;
    a count controller means responsive to said photoelectric light source and receiver arrangement for producing an output responsive to a predetermined count;
    a gate mounted intermediate each of the further conveyor belts for splitting the single file rows into two discharge lanes as activated by said count controller means as it reaches said predetermined count;
    a discharge station for stacking said patties of each of said discharge lanes into pick-off stacks of patties for a subsequent packaging operation;
    the further conveyor belt being arranged for a photobeam to pass therethrough from a photoelectric light source to a photoelectric receiver and thereby the photoelectric light beam is intercepted by the passage of the hamburger patty along said further conveyor belt; and
    a discharge transition station being provided for receiving and passing the hamburger patties, being constructed essentially of an inclined trough extending downwardly from the terminal end of the further conveyor belt;
    said gate being pivotally mounted along and between segments of the further conveyor belt, and such gates being driven mechanically by pivot means from said count controller means.

2. The invention according to claim 1 wherein the primary conveyor belt and the secondary conveyor belt each are driven by separate electric motor means.

3. The invention according to claim 2 wherein said electric motor means are suspended beneath the table stand for driving the terminal roller of each of said conveyor belts.

* * * * *